(12) United States Patent
Bermejo et al.

(10) Patent No.: US 12,496,764 B2
(45) Date of Patent: Dec. 16, 2025

(54) EXTRUSION PERFORATION SYSTEM AND METHOD

(71) Applicant: Bixby International Corporation, Newburyport, MA (US)

(72) Inventors: Ethel Bermejo, Somerville, MA (US); Marc Gagnon, Exeter, NH (US); Chris Van Remoortel, Marblehead, MA (US); Robert Law, Haverhill, MA (US); Rachel Lucier, Lynn, MA (US); Aaron Arsenault, Leominster, MA (US)

(73) Assignee: Bixby International Corporation

( * ) Notice: Subject to any disclaimer, the term of this patent is extended or adjusted under 35 U.S.C. 154(b) by 86 days.

(21) Appl. No.: 18/249,965

(22) PCT Filed: Oct. 21, 2021

(86) PCT No.: PCT/US2021/056063
§ 371 (c)(1),
(2) Date: Apr. 20, 2023

(87) PCT Pub. No.: WO2022/087271
PCT Pub. Date: Apr. 28, 2022

(65) Prior Publication Data
US 2023/0405916 A1   Dec. 21, 2023

Related U.S. Application Data

(60) Provisional application No. 63/104,918, filed on Oct. 23, 2020.

(51) Int. Cl.
B29C 59/04 (2006.01)
B29C 48/00 (2019.01)

(52) U.S. Cl.
CPC .......... B29C 59/04 (2013.01); B29C 48/0011 (2019.02); B29C 48/002 (2019.02)

(58) Field of Classification Search
CPC .... B29C 59/04; B29C 2043/461; B29C 43/46
See application file for complete search history.

(56) References Cited

U.S. PATENT DOCUMENTS

| | | | |
|---|---|---|---|
| 2,817,596 | A | 12/1957 | Schur |
| 3,334,803 | A | 8/1967 | Abbey |

(Continued)

FOREIGN PATENT DOCUMENTS

| | | | |
|---|---|---|---|
| CA | 2432813 A1 | 12/2003 |
| CN | 1287960 A | 3/2001 |

(Continued)

OTHER PUBLICATIONS

International Search Report received for PCT Patent Application No. PCT/US2021/056063, mailed on Mar. 25, 2022, 12 pages.

(Continued)

Primary Examiner — Jacob T Minskey
Assistant Examiner — Virak Nguon
(74) Attorney, Agent, or Firm — Adler Pollock & Sheehan P.C.

(57) ABSTRACT

An extrusion system includes a system to pump a thermoplastic resin melt through an extrusion die, the thermoplastic resin including a polymer base whose rheological properties are modified using fillers, a perforation/embossed roll, and a resilient/pressure backing nip roll through which the extruded thermoplastic resin melt travels between the perforation/embossed roll and the resilient/pressure backing nip roll in a roll nip/station area, exiting the roll nip/station area and around the resilient/pressure backing nip roll and subsequently released from the resilient/pressure backing nip roll as a perforated film, film or fabric carrier supported perforated film, coex laminate, or cut into sheet.

22 Claims, 3 Drawing Sheets

(56) References Cited

U.S. PATENT DOCUMENTS

| | | |
|---|---|---|
| 3,551,544 A | 12/1970 | Hlinka |
| 3,719,736 A | 3/1973 | Woodruff |
| 4,079,114 A * | 3/1978 | Bonner .................. D01D 5/42 425/363 |
| 4,463,045 A | 7/1984 | Ahr et al. |
| 4,501,498 A | 2/1985 | McKelvey |
| 4,522,776 A | 6/1985 | Ramamurthy |
| 4,601,868 A | 7/1986 | Radel et al. |
| 4,608,221 A | 8/1986 | Kurtz et al. |
| 4,678,526 A | 7/1987 | Hawerkamp |
| 4,797,246 A | 1/1989 | Reinke et al. |
| 4,978,486 A | 12/1990 | Ito et al. |
| 6,533,884 B1 | 3/2003 | Mallik |
| 7,381,860 B2 | 6/2008 | Gudnason et al. |
| 2001/0052385 A1 | 12/2001 | Enlow et al. |
| 2005/0029708 A1 | 2/2005 | Coyle |
| 2007/0126145 A1 * | 6/2007 | Coyle .................. B29C 59/04 264/210.2 |
| 2010/0062221 A1 * | 3/2010 | Hoenigmann .......... B32B 38/06 442/329 |
| 2011/0253289 A1 * | 10/2011 | Shepard ................ B29C 66/919 156/66 |
| 2013/0025774 A1 | 1/2013 | Neill et al. |
| 2014/0145374 A1 | 5/2014 | Altonen et al. |
| 2016/0107371 A1 | 4/2016 | Hurme et al. |

FOREIGN PATENT DOCUMENTS

| | | |
|---|---|---|
| CN | 107374828 A | 11/2017 |
| CN | 108608655 A | 10/2018 |
| CN | 106064490 B | 12/2019 |
| CN | 110815761 A | 2/2020 |
| EP | 0107076 A2 | 5/1984 |
| FR | 2353207 A7 | 12/1977 |
| GB | 1265074 A | 3/1972 |
| JP | 4059325 B2 | 12/2007 |

OTHER PUBLICATIONS

"Extended European Search Report received for European Patent Application No. 21883898.5, mailed on Jul. 22, 2024", 8 pages.

* cited by examiner

400

| | Width | Name | Diameter pins (mm) | Distance between pins (mm) | Ratio Spacing or distance: Pin diameter |
|---|---|---|---|---|---|
| Face A | 6 | Hearts | 1.3 | 1.3 | 1:1 |
| Face B | 6 | Squared-Dots | 2 | 2 | 1:1 |
| Face C | 6 | Perforated Honeycomb | 1 | 0.5 | 0.5:1 |
| Face D | 12 | Hybrid 2 mm & 3mm holes | 2 and 3 | 2 and 3 | 0.67:1/1:1 |
| Face E | 6 | Honeycomb | | | |
| Face F | 12 | Mesh | 1 | 0.5 | 1:1 |

EXTRUSION PERFORATION SYSTEM AND METHOD

CROSS REFERENCE TO RELATED APPLICATIONS

This application is a national stage entry of PCT Application Ser. No. PCT/US2021/056063, filed Oct. 21, 2021, which claims benefit from U.S. Provisional Patent Application Ser. No. 63/104,918, filed Oct. 23, 2020, which are incorporated by reference in their entireties.

BACKGROUND OF THE INVENTION

The present invention relates generally to extrusion, and more particularly to an extrusion perforation system and method.

In general, the manufacturing of perforated extruded thermoplastic films, sheets, or laminates usually requires multiple steps. In most two-step processes, a film or sheet must be extruded into either one or several large master rolls for subsequent processing. The extruded web can also be cut and stacked as sheeted product for downstream processing. These extruded rolls or sheet are then perforated through one or more secondary processing operations.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features an extrusion system including a system to pump a thermoplastic resin melt through an extrusion die, the thermoplastic resin including a polymer base whose rheological properties are modified using fillers, a perforation/embossed roll, and a resilient/pressure backing nip roll through which the extruded thermoplastic resin melt travels between the perforation/embossed roll and the resilient/pressure backing nip roll in a roll nip/station area, exiting the roll nip/station area and around the resilient/pressure backing nip roll and subsequently released from the resilient/pressure backing nip roll as a perforated film, film or fabric carrier supported perforated film, coex laminate, or cut into sheet.

In another aspect, the invention features a system including a thermoplastic extrusion die, a perforation/embossed roll, and a resilient/pressure backing nip roll, wherein an extruded polymer melt from the die travels between the perforation/embossed roll and the resilient/pressure backing nip roll in a roll nip/station area.

In still another aspect, the invention features a method including producing a continuous polymer melt web from a cast extruder, forcing the continuous polymer melt web through a flat sheet die from which it exits at a desired width and thickness, nipping the continuous polymer melt web between a first roll and a second roll that are temperature controlled through internal circulation of a heat transfer medium.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

DETAILED DESCRIPTION

Figure 1:
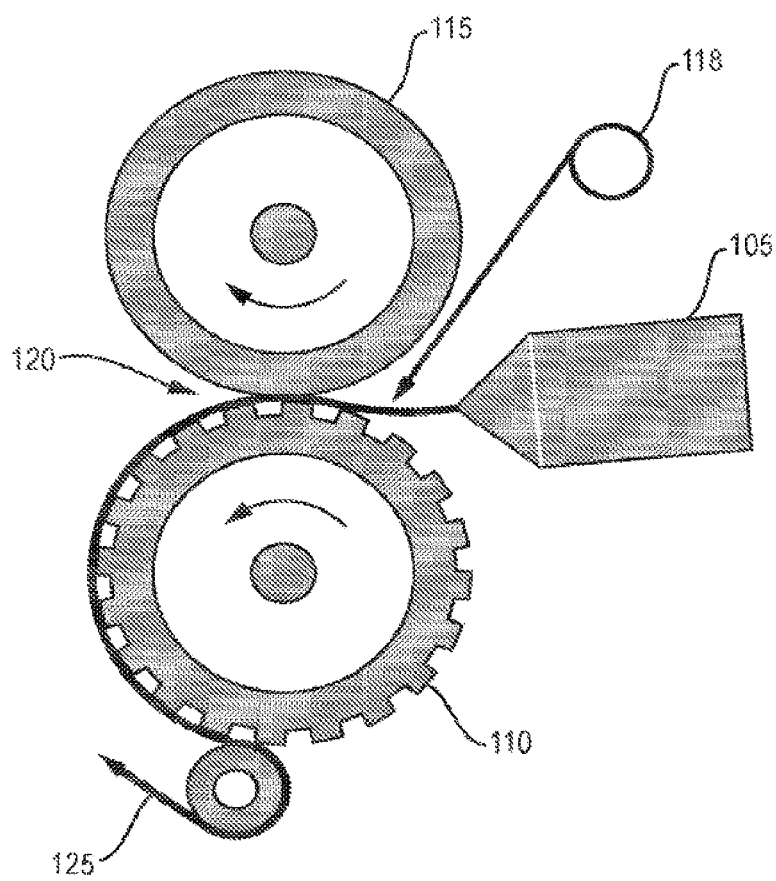
FIG. 1 is a block diagram of an exemplary extrusion system.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As shown in FIG. 1, a portion of an exemplary extrusion system 100 includes an extruded melt 105, a perforation/embossed roll 110, a resilient/pressure backing nip roll 115 (and PET, film interleaf or fabric unwind in some applications 118). The extruded melt web travels between the perforation/embossed roll 110 and the resilient/pressure backing nip roll 115 in a roll nip/station area 120. The extruded melt 105 exits a roll nip/station area 120 and travels around the resilient/pressure backing nip roll 115 as an elastic TPE perforated film (with PET carrier, solid film or sheet if desired for downstream handling 125).

Figure 2:
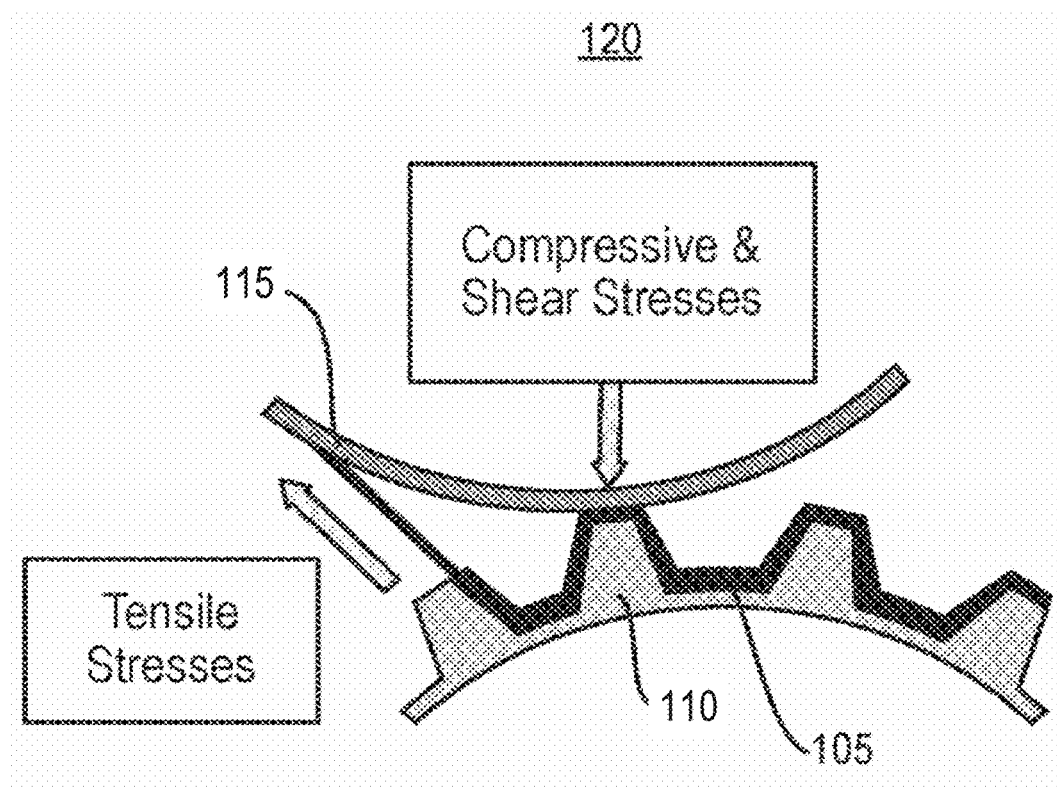
FIG. 2 is a block diagram of the roll nip/station area.

In FIG. 2 the roll nip/station area 120 is shown in greater detail. More particularly, the extruded melt 105 has compressive and shear forces applied to it by the resilient/pressure backing nip roll 115 and tensile stresses applied by the perforation/embossed roll 110.

In summary, the exemplary extrusion system enables in-situ and continuous perforation of either rigid or elastic thermoplastic materials during the extrusion process (i.e., perforation does not require a secondary separate operation) and without the need for vacuum or other assists. In addition, the single-step process reduces waste significantly.

The cast extruder (extrusion system 100) is used to produce a continuous polymer melt web. The homogeneous melt is forced to flow through a flat sheet die from which it exits at the desired width and thickness. The polymer melt exiting the die is nipped between two rolls 110 and 115 that are temperature controlled via internal circulation of an appropriate heat transfer medium such as hot water or oil or a mix of the two.

The perforation/embossed roll (or patterned chill roll 110) is a metal roll such as steel core roller or equivalent whose surface has been engraved to contain three-dimensional designs such as pins (and, if desired, embossing patterns). These engraved pins create the desired through-holes and relief patterns in the molten web, in-situ, during extrusion.

The specific three-dimensional geometries, patterns, and sizes of the pins and embossing features can be etched using various known techniques such as chemical, laser, or mechanical etching. The perforation/embossed roll (or steel roller) 110 is usually coated with a chrome plating or equivalent to increase durability of the roll.

The molten polymer web coming from the extruder die is deposited onto the surface of the metal roll (perforation/embossed roll 110) and the web then conforms to the embossed features on the surface and is compressed, with a tearing shear force and tensile force while polymer at the pin tip is forced around the pin, leaving a perforated hole in the molten web where the pin compressed into the resilient/pressure backing roll.

The second roll (resilient/pressure backing nip roll 115) is a hard durometer rubber roll preferably encased in Polytetrafluoroethylene (PTFE) shrink-wrap or similar fluoropolymer film to enhance roll durability, durometer, and release of cooled polymer film and "chads.". The purpose of this roll 115 (i.e., resilient/pressure backing nip roll 115) is to "pull off" the perforated extruded film from the metal roll 110 (perforation/embossed roll) and to provide the compression forces of the film against the engraved roll pin tips in the nip. The compressive forces of the rubber roll (resilient/pressure backing nip roll 115) acting upon the polymer web that is deposited on the engraved roll 110 (perforation/embossed roll) create certain areas with stress concentrators, mostly at the top of the pins of the metal roll 110 (perforation/embossed roll). The subsequent action of the puller roll (resilient/pressure backing nip roll 115) stretching the cooled film in the machine direction helps these stress concentrators to create micro-cracks that propagate as they are under a stretch force. The stretching force pulls and separates the "chads" or fragmented holes from the main film. These "chads" stay on the rubber roll (resilient/pressure backing nip roll 115) and can be collected through vacuum assistance, a sticky driven idler, or by other means and eventually be recycled.

One key to the in-situ extrusion perforation process described above is designing and controlling the specific mechanical geometry, rheological and thermal properties, and their close relationships, necessary to create the proper stresses on the dynamic polymer web through the perforating process step.

First, the polymer's rheological properties, which can be modified using fillers or additives in the polymer chosen for this process, are critical to success. The polymer base resins can include thermoplastic elastomers such as polyurethanes, styrene-block-copolymers, polyether block amides, polyester adhesives, nylon adhesives, functionalized olefins, or copolyesters. They can also include higher durometer and rigid polymers like copolyesters, styrenics, polycarbonates, or nylons. The inorganic or organic fillers include nano calcium carbonate, calcium carbonate, titanium dioxide, talc, carbon black, and so forth. The fillers are selected to manage the rheological properties of the base polymer at process temperatures to ensure proper perforation without causing a dramatic change on the intrinsic properties of the polymer matrix itself when solidified.

Second, the geometric design of the patterned engraved roll (perforation/embossed roll 110) surface is also important to ensure effective perforation. The diameter of the pins are equivalent to the size of the perforated hole desired. The spacing or distance between the pins, the depth of the engraved roll 110 (perforation/embossed roll 110), and ratio of these two variables need are strategically defined to ensure a successful perforating process based on the selected polymer formulation. The pin and detail design of the engraved pattern must also consider specific radii and draft angles to facilitate the creation of stress concentrations while the molten polymer goes from a low melt elongation/melt strength state through to a higher melt elongation and ultimately to a solid, formed web. The combination of properly designed and located stress concentrations in the roll emboss geometry, with a tailored melt rheology enables the melt web to tear in a controlled manner as the web cools, shrinks and forms into a solid film or sheet if desired for downstream handling 125. The ratio of the depth, size and spacing of design geometries and pins also controls the degree of web stretching through the roll nip during rapid cooling, shrink, and pulling from the roll. Proper design of these mechanical details ensures the appropriate stress is applied to the dynamically cooling formulated polymer web. In this manner, the roll and polymer variables create the mechanical and rheological conditions such that perforations can occur in the web simultaneously through the nip. Finally, the specific extrusion temperatures, gauge and output is set to deliver the molten web with the proper rheology as described to be perforated through the nip and subsequently cooled in place on the etched texture roll 110 (perforation/embossed roll 110). Sufficient cooling capacity must be available to closely control the temperature of the roll 110 (perforation/embossed roll 110) and hence further manage the rheology of the polymer as it enters, passes through, and exits the nip section between the rubber and embossing roll.

Because the molten polymer web from extruded melt 105 is quench cooled upon contacting the metal pins and emboss detail of the cooling roll (resilient/pressure backing nip roll 115) while the interstices between these design details remain hot and molten, both thermal shrinkage and mechanical stresses act at the designed stress concentrations on pins and geometric patterns. The combination of those stresses and design geometries creates controlled cracks in the web that propagate, tearing along pin and patterned edges. The edges are stress concentrators that separate quenched solidifying polymer from 'elastic' molten polymer in the designed pattern's valleys. With the edges sheared by compressive forces developed as the web is driven into the rubber backing roll, the polymer still cooling in the valleys is stretched, pulled under tension from the metal roll, completing the perforation around the pins and design.

The perforated (and embossed if desired) polymer web is now solidified into a plastic web that can now be wound onto a core to create a continuous roll of perforated film or sheet. If the rolled film or sheet material has a propensity to block, or stick together, a liner or separator film can be introduced downstream or at the nip extrusion/station area to facilitate downstream use or unwinding of the film to prevent sticking or blocking of the perforated roll. An unwind roll located before the extrusion die contains the thin PET liner (0.001"-0.005" thick) to be used as a supporting film that improves handling of the extruded film in downstream equipment processes like slitting, die-cutting, and winding. As an option depending on the application, the PET liner is passed through an idler and tensioning roll to remove wrinkles and flatten the web before it is introduced above the extrusion die directly into the extrusion nip-area between the perforated/embossed roll and the resilient/pressure backing nip roll Similarly, another material could be introduced here in place of a PET or other carrier liner. For instance, introducing a four-way stretch material like a knit or an elastic fabric, like Lycra® or Spandex®, allows improved web handling of the perforated elastic core material while also laminating to a fabric in one step. For many applications, this eliminates the need for further downstream processing to make a laminate.

Figure 3:
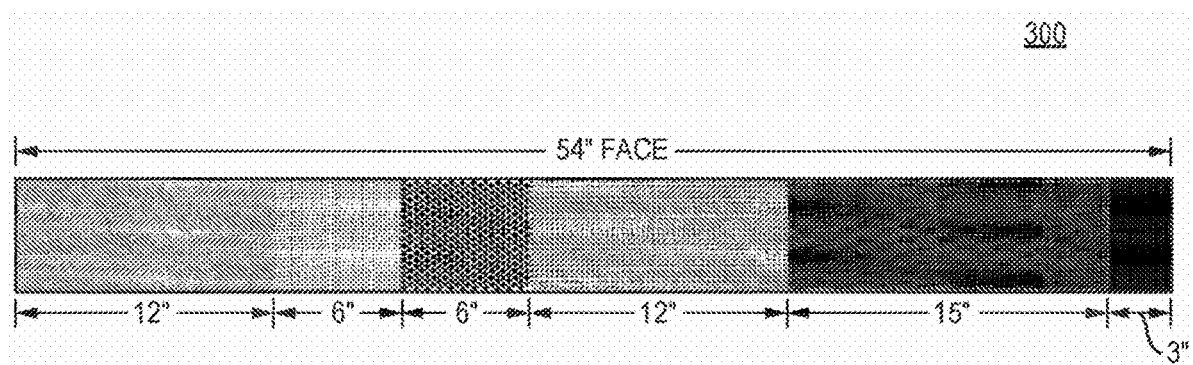
FIG. 3 illustrates an exemplary design of the perforating metal roll.

In FIG. 3, an example of a design of the perforating metal roll 300 is illustrated. The patterned/perforating metal roll 300 includes strategically spaced pins and geometrical features that enhance the aesthetics and the properties of the perforated film. The patterned (perforating) metal roll 300 can have one or multiple designs with varying pin diameter (>0.5 mm) and spacing (>0.5 mm) and with embossed figures on some of them such as hearts, honeycomb, flowers, and so forth.

Figures 4, 5:
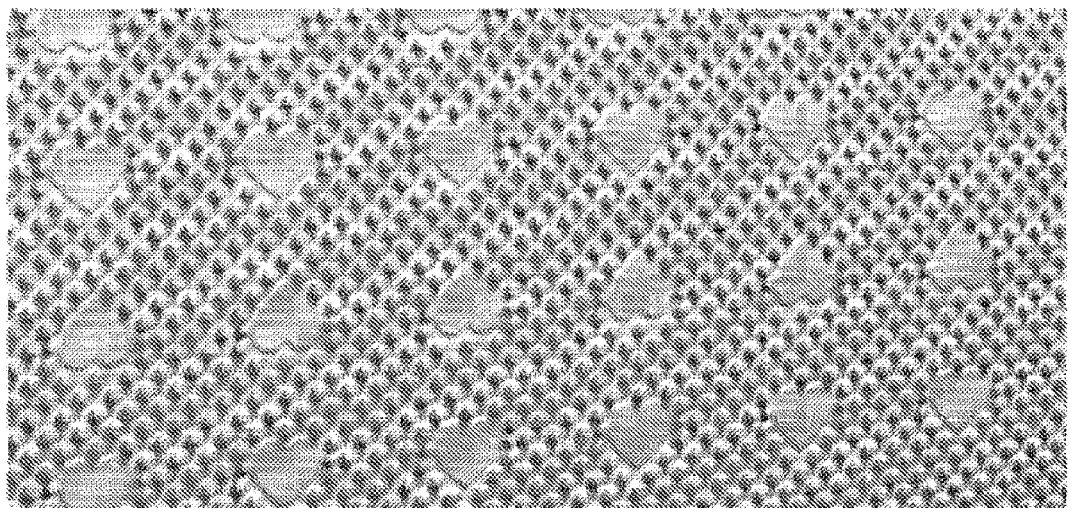
FIG. 4 illustrates an exemplary design of the perforating roll with the pins.
FIG. 5 illustrates a table.

In FIG. 4, an example of a design 400 of the perforating roll with the pins (diameter 1.3 mm) and embossed hearts is illustrated.

In FIG. 5, TABLE 1 illustrates exemplary design features on an engraved roll to ensure effective perforation. Here, a depth of the engraved roll is 0.040".

Perforation of plastic films provides important performance features—for example, they can make apparel more breathable and comfortable. In the apparel and textile industries, elastic stretch or rigid adhesive films are replacing traditional sewn seams, reinforcement tapes or compression garments. These films include materials such as polyurethanes, styrene-block-copolymers, polyether block amides, polyester adhesives, nylon adhesives, and silicones. They are used in garments for better control of stretch force, increased elasticity and recovery, and enhanced control of pressure in certain areas of the body. However, the intrinsic nature of the polymer chains and their morphology make these films poor carriers of body moisture and heat which could result in discomfort (e.g., a moist and hot film/fabric could continuously rub the skin to the point of blisters). A common solution is to perforate the films via a secondary conversion step.

There are several commercial applications and end use cases where perforations create additional film functionality—for example, perforations can (1) provide liquid or gas permeability in garments; (2) allow vacuum to be pulled through for use in industrial applications such as vacuum cutting belts; (3) allow the release of air that can be trapped at the interface of laminated substrates or sheets during multi-layer constructions; (4) create unique aesthetics via perforated patterns and embossing effects in monolayer and laminate products; (5) manage heat transfer and cooling at the interface between two substrates or surfaces (e.g., air-cooled automotive seating). In all these cases the one-step process above brings major advantages in cost, quality, and efficiency.

The one-step process of the present invention greatly simplifies the extrusion of rigid and elastic perforated thermoplastic film and sheet by accomplishing the extrusion, perforation and embossing in a single step. This is more cost-effective by eliminating the need for secondary processing and the associated steps and expense of interim work-in-process (WIP) goods (rolls or sheets) which need to be conveyed or transferred to separate perforating equipment (e.g. hot-pin or cutting rolls-sometimes at different locations/facilities). Additional handling is further avoided if the final product includes an embossed design which may require registering the perforations for proper alignment of the embossing.

The present invention enables the manufacture of unique, innovative and cost-advantaged products for several markets-notably apparel and textile, durable decorative laminates, and belting.

The present invention is of value for elastic products where perforation and embossing can enhance the design, texture and functionality of the products to create customized and unique product branding or end use.

Potential applications include, for example:

(1) Fashion textiles, no sew assembly and elastics in apparel and textiles:

Formable, bondable (no sew), breathable, decorative embossed and/or perforated thermoplastic elastics and textiles. Apparel products and components to replace latex, silicone, natural rubber elastic products that can't be formed or bonded. Elastic apparel without latex allergy or silicone sensitivity. Would be used by intimate apparel, underwear, sportswear, textile, footwear companies in functional and fashion products. Used as elastics in all types of clothing and footwear fashions and brands. Elastic products can be applied without sewing acting as a fastening system to replace sewn seams while also acting as an elastic for fit and movement enhancement in clothes design.

(2) Industrial coated fabrics and belts that require breathability or ability to draw vacuum through fabric/belt to hold items in place on belts/surfaces or to remove liquids from products on belts or surfaces, e.g., cutting belts that hold sheet goods in place for die cutting; paper machine clothing belts that are used to draw water from pulp emulsions, conveyor belts that use vacuum to handle items being carried, drying belts that allow passage of water and heat from beneath the product to be dried, and so forth.

(3) Various film and sheet products that are attached to smooth surfaces for decoration, protection & durability, or haptic (grip or elastic/spongy tactile feel & design); perforation allows release of trapped air bubbles from between surface interface:
 a. Decals
 b. Logos
 c. Screen & Paint protection films
 d. Soft touch grip films It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. An extrusion system comprising:
 a fabric unwind that is configured to unwind a fabric from a roll and introduce the fabric to a compression roll nip/station area, where the fabric enters an extrusion die;
 a system to pump a thermoplastic resin melt to the extrusion die, the thermoplastic resin comprising a polymer base whose rheological properties are modified using fillers; wherein the thermoplastic resin melt contacts one side of the fabric at the extrusion die, and the opposite side of the fabric is not contacted by the resin melt;
 a rolling perforation/embossed roll in contact with the thermoplastic resin melt on the one side of the fabric that is in contact with the resin melt; and
 an opposite-rolling resilient/pressure backing nip roll in contact with the fabric at the opposite side of the fabric, opposite to the one side of the fabric that is in contact with the thermoplastic resin melt; and configured to be compressing both the fabric and thermoplastic resin melt against the perforation/embossed roll while opposite rolling in opposite to the rolling perforation/embossed roll, and through which a co-extruded thermoplastic resin melt with the fabric travels between the perforation/embossed roll and the resilient/pressure backing nip roll in the compression roll nip/station area are configured to first quench cool both the fabric and the thermoplastic resin melt and second then simultaneously perforate and emboss only the thermoplastic resin melt, and third configured to exit both from the compression roll nip/station area and from the resilient/pressure backing nip roll whereupon both are subsequently released from the compression roll nip/station area and from the extrusion die as a perforated film, as a film or fabric carrier supported perforated film, or as a co-extruded polymer melt.

2. The system of claim 1, wherein the resilient/pressure backing nip roll is configured to apply compressive and shear forces to the co-extruded thermoplastic resin melt with the fabric; and wherein the perforation/embossed roll is configured to apply tensile stresses to the co-extruded thermoplastic resin melt with the fabric; and wherein the co-extruded thermoplastic resin melt with the fabric has compressive and shear forces applied to it by the resilient/pressure backing nip roll and tensile stresses applied by the perforation/embossed roll.

3. The system of claim 2, wherein the perforation/embossed roll and the resilient/pressure backing nip roll both include a temperature control via an internal circulation of a heat transfer medium.

4. The system of claim 3, wherein the perforation/embossed roll is a metal roll whose surface has been engraved to contain three-dimensional designs.

5. The system of claim 4, wherein the resilient/pressure backing nip roll is a hardened rubber roll.

6. The system of claim 5, wherein the resilient/pressure backing nip roll is encased in polytetrafluoroethylene (PTFE) shrink-wrap or a fluoropolymer film configured to provide roll durability and release of cooled polymer film and chads.

7. The extrusion system of claim 1, wherein the polymer base includes one or more of polyurethanes, styrene-block-copolymers, polyether block amides, polyester adhesives, nylon adhesives, functionalized olefins, copolyesters, styrenics, polycarbonates, or nylons.

8. The extrusion system of claim 7, wherein the fillers are including nano calcium carbonate, calcium carbonate, titanium dioxide, talc, or carbon black.

9. A system comprising:
a fabric unwind that is configured to unwind a fabric from a roll and introduce the fabric to a compression roll nip/station area, where the fabric ais first coated by a thermoplastic extrusion die;
a pump configured to pump a thermoplastic resin melt to the thermoplastic extrusion die, the thermoplastic resin comprising a polymer base whose rheological properties are modified using fillers; from which the thermoplastic resin melt contacts one side of the fabric at a thermoplastic extrusion die exit, and the opposite side of the fabric is not contacted by the resin melt;
a rolling perforation/embossed roll in contact with the thermoplastic resin melt on the one side of the fabric that is in contact with the resin melt; and
an opposite rolling resilient/pressure backing nip roll in contact with the fabric at the opposite side of the fabric, opposite to the side of the fabric that is in contact with the thermoplastic resin melt; and configured to be compressing both the fabric and thermoplastic resin melt against the perforation/embossed roll rolling in opposite direction to the rolling perforation/embossed roll, and wherein an extruded polymer melt coated on a fabric carrier from the thermoplastic extrusion die travels between the perforation/embossed roll and the resilient/pressure backing nip roll in a roll nip/station area; wherein the perforation/embossed roll and the resilient/pressure backing nip roll in the compression roll nip/station area are configured to first quench cool both the fabric and the thermoplastic resin melt and second then simultaneously perforate and emboss the thermoplastic resin melt, and third configured to exit both from the compression roll nip/station area and from the resilient/pressure backing nip roll whereupon both are subsequently released from the compression roll nip/station area as a perforated film, or as a film or fabric carrier supported perforated film.

10. The system of claim 9, wherein the extruded polymer melt exits the roll nip/station area and travels around the resilient/pressure backing nip roll as a perforated film without a polyethylene terephthalate (PET) carrier film or fabric.

11. The system of claim 10, wherein the perforation/embossed roll comprises one or more strategically spaced pins and geometrical features that enhance aesthetics and properties of the perforated film.

12. The system of claim 11, wherein the strategically spaced pins have varying pin diameters, each of the varying pin diameters greater than 0.25 millimeters (mm).

13. The system of claim 12, wherein the strategically spaced pins have varying spacings greater than 0.25 mm.

14. The system of claim 13, wherein the perforation/embossed roll further comprises embossed figures.

15. The system of claim 14, wherein the embossed figures include one or more of hearts, honeycombs, flowers, and/or one or more custom geometries.

16. A method comprising the steps of:
(1) obtaining an extrusion system comprising:
a fabric unwind that is configured to unwind a fabric from a roll and introduce the fabric to a compression roll nip/station area, where the fabric is first coated by a thermoplastic extrusion die:
a pump configured to pump a thermoplastic resin melt to the thermoplastic extrusion die, the thermoplastic resin comprising a polymer base whose rheological properties are modified using fillers; from which the thermoplastic resin melt contacts one side of the fabric at a thermoplastic extrusion die exit, and the opposite side of the fabric is not contacted by the resin melt;
a rolling perforation/embossed roll in contact with the thermoplastic resin melt on the one side of the fabric that is in contact with the resin melt; and
an opposite rolling resilient/pressure backing nip roll in contact with the fabric at the opposite side of the fabric, opposite to the side of the fabric that is in contact with the thermoplastic resin melt; and configured to be compressing both the fabric and thermoplastic resin melt against the perforation/embossed roll rolling in opposite direction to the rolling perforation/embossed roll, and wherein an extruded an extruded polymer melt coated on a fabric carrier from the thermoplastic extrusion die travels between the perforation/embossed roll and the resilient/pressure backing nip roll in a roll nip/station area; wherein the perforation/embossed roll and the resilient/pressure backing nip roll in the compression roll nip/station area are configured to first quench cool both the fabric and the thermoplastic resin melt and second then simultaneously perforate and emboss the thermoplastic resin melt, and third configured to exit both from the compression roll nip/station area and from the resilient/pressure backing nip roll whereupon both are subsequently released from the compression roll nip/station area as a perforated film, or as a fabric carrier supported perforated film; whereby a continuous polymer melt web or polymer melt is made;

(2) producing the continuous polymer melt web from the extrusion system;

(3) forcing the polymer melt through a flat sheet die from which it exits as a web at a desired width and thickness; and (4) nipping the continuous polymer melt web between a first roll and a second roll that are temperature controlled through an internal circulation of a heat transfer medium.

17. The method of claim 16, wherein the heat transfer medium includes hot water.

18. The method of claim 16, wherein the heat transfer medium includes oil.

19. The method of claim 16, wherein the first roll is in a shape of a patterned chill roll.

20. The method of claim 19, wherein the shape of the patterned chill roll is provided as a metal roll whose surface has been engraved to contain three-dimensional designs that create through-holes and relief patterns in the polymer melt web.

21. The method of claim 20, wherein the second roll is a hardened rubber roll.

22. The method of claim 21, wherein the hardened rubber roll is encased in polytetrafluoroethylene (PTFE) shrink-wrap configured to provide roll durability and release of cooled polymer film and chads.

* * * * *